(12) United States Patent
Wang et al.

(10) Patent No.: US 8,443,444 B2
(45) Date of Patent: May 14, 2013

(54) MITIGATING LOW-RATE DENIAL-OF-SERVICE ATTACKS IN PACKET-SWITCHED NETWORKS

(75) Inventors: Jia Wang, Randolph, NJ (US); Chia-Wei Chang, San Diego, CA (US); Seungjoon Lee, Basking Ridge, NJ (US); Bill Lin, La Jolla, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 377 days.

(21) Appl. No.: 12/621,212

(22) Filed: Nov. 18, 2009

(65) Prior Publication Data

US 2011/0119761 A1    May 19, 2011

(51) Int. Cl.
*G06F 11/00* (2006.01)
(52) U.S. Cl.
USPC ............................. 726/23; 370/401; 359/167
(58) Field of Classification Search ............ 359/167; 726/22–23
See application file for complete search history.

(56) References Cited

U.S. PATENT DOCUMENTS

| 7,478,429 | B2 * | 1/2009 | Lyon | 726/23 |
| 2003/0086140 | A1 * | 5/2003 | Thomas et al. | 359/167 |

OTHER PUBLICATIONS

"The Taming of The Shrew: Mitigating Low-Rate TCP-Targeted Attack," Chia-Wei Chang, 2009 29th IEEE International Conference on Distributed Computing Systems, pp. 137-144.

"Low-Rate TCP-Targeted DoS Attack Disrupts Internet Routing," Ying Zhang.

"Defending Against Low-rate TCP Attacks: Dynamic Detection and Protection," Haibin Sun, Proceedings of the 12th IEEE International Conference on Network Protocols (ICNP'04), 2004.

"Distributed Denial of Service: Taxonomies of Attacks, Tools and Countermeasures," Stephen M. Specht, Proceedings of the 17th International Conference on Parallel and Distributed Computing Systems, 2004 International Workshop on Security in Parallel and Distributed Systems, pp. 543-550, Sep. 2004.

"Low Rate TCP Denial-of-Service Attack Detection at Edge Routers," Amey Shevtekar, IEEE Communications Letters, vol. 9, No. 4, pp. 363-365, Apr. 2005.

"Empirical Study of Buffer Management Scheme for Diffserv Assured Forwarding PHB," Rupinder Makkar, Presented at ICCCN2000, pp. 1-6, 2000.

"SNORT—Lightweight Intrusion Detection for Networks," Martin Roesch, Proceedings of LISA '99: 13th Systems Administration Conference Seattle, Washington, Nov. 7-12, 1999, pp. 229-238.

"Controlling High-Bandwidth Flows at the Congested Router," Ratul Mahajan, AT&T Center for Internet Research at ICSI (ACIRI), Berkeley, CA.

(Continued)

*Primary Examiner* — Nathan Flynn
*Assistant Examiner* — Phuoc Tran
(74) *Attorney, Agent, or Firm* — Akerman Senterfitt; Michael K. Dixon; Roy Zachariah

(57) ABSTRACT

A method includes determining, at a network routing device, an average packet drop rate for a plurality of aggregations of packet flows. The method also determines a threshold packet drop rate based on the average packet drop rate, a current packet drop rate for a select aggregation of the plurality of aggregations, and whether at least one packet flow of the select aggregation is potentially subject to a denial-of-service attack based on a comparison of the current packet drop rate to the threshold packet drop rate.

20 Claims, 2 Drawing Sheets

OTHER PUBLICATIONS

"On a New Class of Pulsing Denial-of-Service Attacks and the Defense," Xiapu Luo, Department of Computing, The Hong Kong Polytechnic University, Kowloon, Hong Kong, SAR, China.

"HAWK: Halting Anomalies with Weighted Choking to Rescue Well-Behaved TCP Sessions from Shrew DDoS Attacks," Yu-Kwong Kwok, ICCNMC 2005, LNCS 3619, pp. 423-432, 2005.

"Low-Rate TCP-Targeted Denial of Service Attacks (The Shrew vs. the Mice and Elephants)," Aleksandar Kuzmanovic, SIGCOMM'03, Aug. 25-29,2003,Karsruhe,Germany, pp. 75-86.

"Analysis of an Equal-Cost Multi-Path Algorithm," C. Hopps, Network Working Group, NextHop Technologies, Nov. 2000.

"Reduction of Quality (RoQ) Attacks on Internet End-Systems," Mina Guirguis, Computer Science Department, Boston University, Boston, MA.

"Implementation of BGP in a Network Simulator," Dongliang, Tony, Applied Telecommunication Symposium, pp. 149-154.

"Evolution of the Internet QoS and Support for Soft Real-Time Applications," Mohamed A. El-Gendy, Proceedings of the IEEE, vol. 91, No. 7, Jul. 2003, pp. 1086-1104.

"Explicit Allocation of Best-Effort Packet Delivery Service," David D. Clark, IEEE/ACM Transactions on Networking, vol. 6, No. 4, Aug. 1998, pp. 362-373.

"Proactive Surge Protection: A Defense Mechanism for Bandwidth-Based Attacks," Jerry Chou, 17th USENIX Security Symposium, pp. 1-15.

"Filtering Shrew DDoS Attacks Using a New Frequency-Domain Approach," Yu Chen, The First IEEE LCN Workshop on Network Security (WoNS 2005), Sydney, Australia, on Jun. 20, 2005, pp. 123-138.

"On Estimating End-to-End Network Path Properties," Mark Allman, SIGCOMM '99 Aug. 1999 Cambridge, MA, USA, pp. 263-274.

* cited by examiner

MITIGATING LOW-RATE DENIAL-OF-SERVICE ATTACKS IN PACKET-SWITCHED NETWORKS

FIELD OF THE DISCLOSURE

The present disclosure generally relates to packet-switched networking, and relates more particularly to protecting against denial-of-service attacks in packet switched networks.

BACKGROUND

Packet-switched networks rely on the efficient transmission of packets across network links. Malicious entities often attempt to disrupt this efficient data flow using denial-of-service (DoS) attacks whereby a network device is flooded with a large volume of network traffic. The resources and bandwidth of the network device are then consumed in handling this flood of network traffic. As a result, the network device is forced to begin dropping packets associated with legitimate packet flows and thus reduce throughput and quality of legitimate network services provided by the network device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
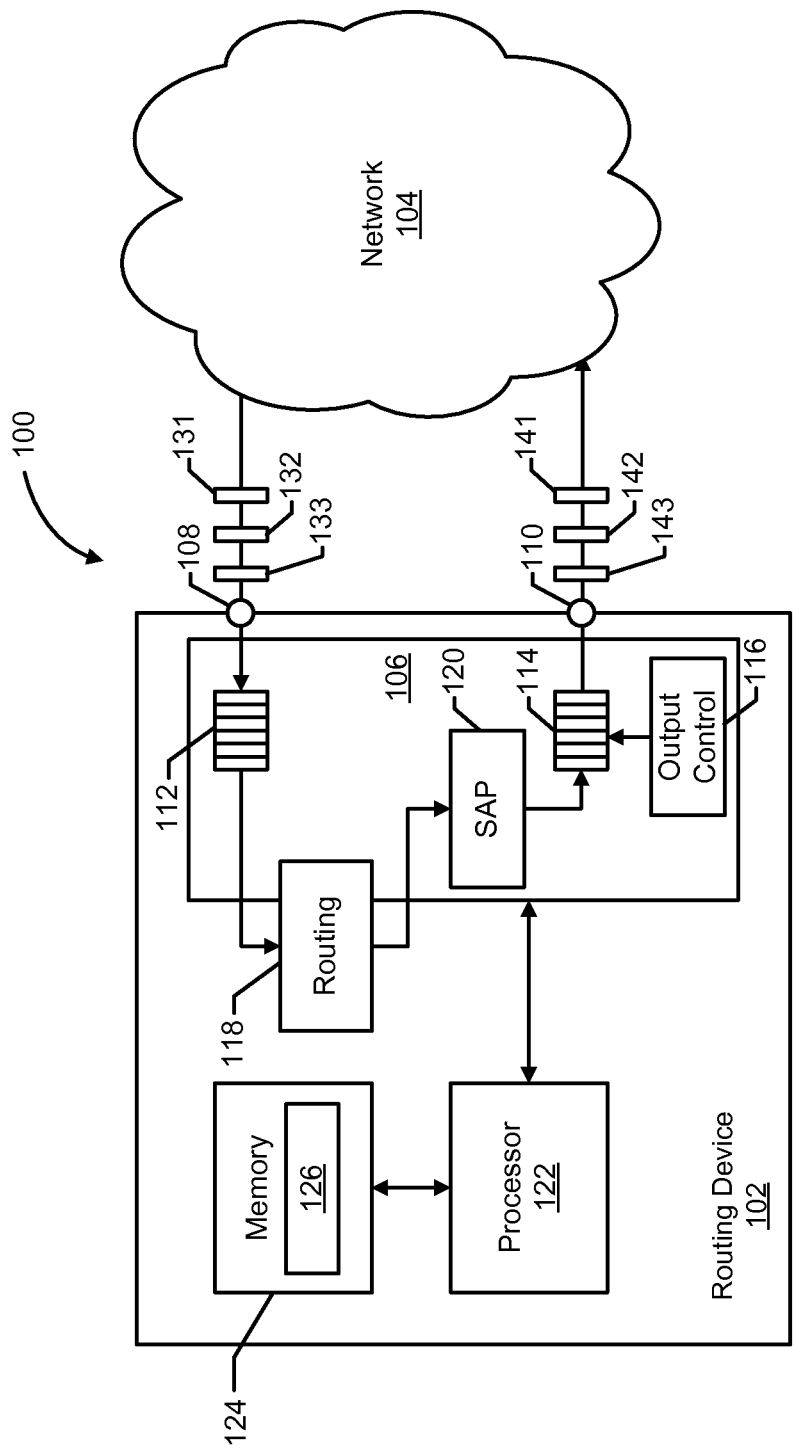
FIG. 1 is a diagram illustrating network system implementing a shrew attack protection (SAP) mechanism in accordance with at least one embodiment of the present disclosure.
Figure 2:
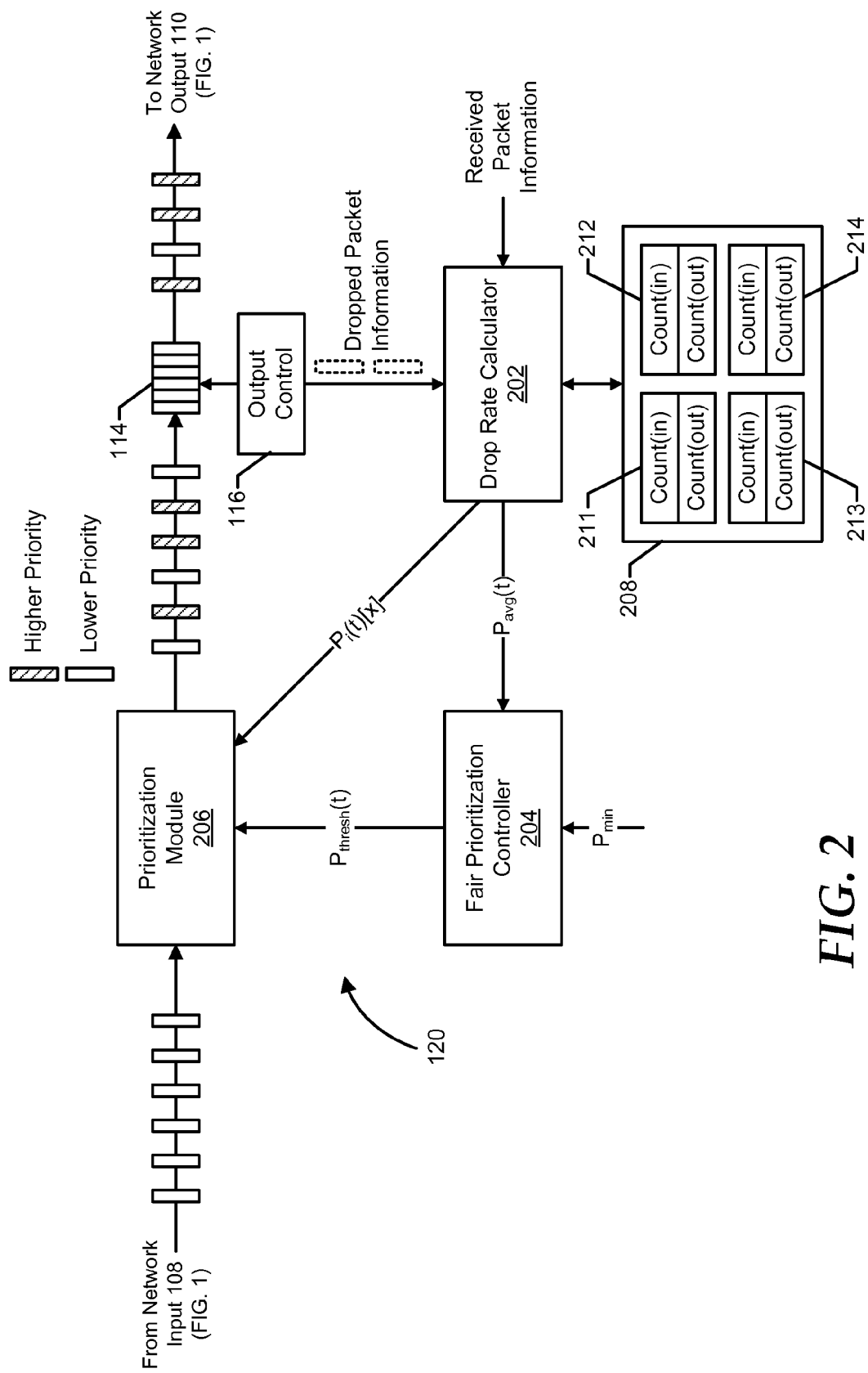
FIG. 2 is a diagram illustrating a SAP module for implementing the SAP mechanism at a network routing device of the network system of FIG. 1 in accordance with at least one embodiment of the present disclosure.

FIGS. 1 and 2 illustrate example techniques for mitigating low-rate denial-of-service attacks (also commonly referred to as "shrew" attacks) in packet-switched networks. A shrew attack exploits the retransmission time-out (RTO) mechanism of the Transport Communication Protocol (TCP) whereby bursts of connection requests from an attacker are synchronized to the RTO value employed by the network routing device that is the target of the attack. As such, when a node in the network retransmits a packet after expiration of a retransmission timer, the packet will reach the network routing device as it is already inundated with the synchronized burst, thereby leading to repeated packet drops in packet flows associated with the port being targeted by the shrew attack. These repeated packet drops can degrade the performance of TCP-based protocols and services provided by the network routing device, including Internet routing services such as Border Gateway Protocol (BGP) services. Accordingly, in one embodiment, the network routing device can employ a shrew attack protection (SAP) mechanism whereby the average packet drop rate for packet flows is dynamically updated and used to determine if any particular subset, or aggregation, of the packet flows serviced by the network routing device may include a packet flow that is potentially subject to a shrew attack. To identify whether a packet flow of a selected aggregation is a victim to a shrew attack, the network routing device determines the current, or instant, packet drop rate for the selected aggregation and compares this current packet drop rate with the average packet drop rate across all of the aggregations. In the event that the current packet drop rate for the selected aggregation is greater than the average packet drop rate across all of the aggregations, the outgoing packets of the packet flows of the selected aggregation are marked or otherwise identified as having a higher priority status. Otherwise, if the current packet drop rate for the selected aggregation is equal to or less than the average packet drop rate across all of the aggregations, the outgoing packets of the packet flows of the selected aggregation are marked or otherwise identified as having a lower priority status (a normal priority status, for example).

The network routing device mitigates any potential shrew attack by preferentially selecting those packets identified as having the higher priority status for transmission by the network routing device over those packets identified as having the lower or normal priority status. By giving packets of packet flows potentially victim to a shrew attack a higher priority for output, the network routing device can more fully ensure that the packets of the potential victim packet flows are successfully transmitted and thus diminish the packet drop rate for the potential packet flows and neutralize the shrew attack. This SAP mechanism can be employed in conjunction with other conventional congestion-management schemes that employ preferential packet dropping, such as the Active Queue Management (AQM) policy or the Weighted Random Early Detection (WRED) policy.

FIG. 1 illustrates a portion of a network system 100 employing the shrew attack protection (SAP) mechanism in accordance with at least one embodiment of the present disclosure. The network system 100 includes a network routing device 102 connected to one or more packet-switched network segments 104. The network routing device 102 can include, for example, a router, a switch, a bridge, and the like. The network segment 104 can include a network segment compliant with any of a variety of protocols potentially subject to a shrew attack. For purposes of illustration, the network segment 104 and the SAP mechanism are described below in the example context of a TCP-based network, such as an Internet Protocol/Transmission Control Protocol (IP/TCP) network (the Internet or a local area network (LAN), for example).

The network routing device 102 includes a line interface 106 having a network input 108 and a network output 110 coupled to one or more network segments 104, an input buffer 112 to buffer packets received from a network segment 104 via the network input 108, and an output buffer 114 to buffer packets for transmission to a network segment 104 from the network output 110. For ease of illustration, the network input 108 and the network output 110 are depicted as connected to the same network segment 104. However, it will be appreciated that the network routing device 102 may be connected to multiple network segments 104 and thus have multiple network inputs and network outputs. The line interface 106 further includes an output control module 116 to control the processing of packets buffered in the output buffer 114 for output via the network output 110 and a routing mechanism 118 to implement various routing processes for packets within the network routing device 102. These routing processes can include, for example, routing packets to the appropriate output, filtering packets, encapsulating packets, encrypting/decrypting packets, and the like. The line interface 106 also includes a SAP module 120 to implement the SAP mechanism described herein for outgoing packets. The illustrated components of the network routing device 102 can be implemented in hardware, in one or more processors to execute software representative of the functionality described herein, or a combination thereof. To illustrate, the network routing device 102 can include, for example, a processor 122 and a memory 124, whereby the memory 124 includes a computer program 126 comprising a set of executable instructions that are accessed from the memory 124 and executed by the processor 122 to perform one or more of the functions described herein.

In operation, incoming packets (such as packets 131, 132, and 133) are received at the network input 108 of the network routing device 102, buffered in the input buffer 112, and then routed to the appropriate output of the network routing device 102 by the routing mechanism 118. In the process, the SAP module 120 monitors the incoming packets and the outgoing packets for the various packet flows processed by the network routing device 102 so as to dynamically determine the average packet drop rate for the packet flows in total, as well as to determine the current packet drop rates related to individual packet flows or aggregations thereof. Although the packet drop rate can be maintained on a per-flow basis, the resources necessary to maintain such statistics typically are difficult for a typically network routing device to maintain. Accordingly, rather than monitor the packet drop rate for each packet flow, the SAP module 120 groups the packet flows into a plurality of aggregations based on one or more aggregation criteria and determines the packet drop rate on a per-aggregation basis. Any of a variety of aggregation criteria may be used, although different aggregation criteria may have different performance trade-offs between accuracy and memory/computation requirements. In one embodiment, the SAP module 120 employs an application-level granularity to the aggregation of packet flows by using the destination port found in the destination port field of the TCP/IP header of the packets as the aggregation criterion. Accordingly, all packet flows directed to the same destination port are combined by the SAP module 120 into the same aggregation of packet flows. Other examples of aggregation criteria include the destination IP address, the source IP address, a hash of various fields of the packets, and the like. The aggregation criterion also can include a combination of other aggregation criteria, such as a combination of the destination IP address and the source IP address. As the SAP mechanism is not limited to aggregation of multiple packet flows but instead can be performed on an individual packet flow basis, reference to an aggregation of packet flows also includes a single packet flow for implementations of the SAP mechanism on a per-flow basis (that is, the aggregation criterion in such instances can be an identifier unique to a single packet flow).

The SAP module 120 uses the average packet drop rate across all of the aggregations ($P_{avg\_tot}$) to set a threshold packet drop rate ($P_{thresh}$), which is then compared with the current packet drop rates for each of the aggregations to identify any aggregations having packet flows that are potentially subject to a shrew attack. In one embodiment, the SAP module 120 identifies an aggregation as having a packet flow potentially victim to a shrew attack when the current packet drop rate of the aggregation is greater than the current threshold packet drop rate for all of the aggregations. Conversely, the SAP module 120 identifies an aggregation as not having any packet flows potentially victim to a shrew attack when the current packet drop rate of the aggregation is less than the current threshold packet drop rate. The SAP module 120 then assigns a priority status to packets based on whether their associated aggregation has been identified as a potential victim of a shrew attack. For an aggregation identified as a potential victim, the SAP module 120 marks the packets of the packet flows of the aggregation as having a higher priority status. For an aggregation identified as not potentially subject to a shrew attack, the SAP module 120 marks the packets of the packet flows of the aggregation as having a lower priority status.

The output control module 116 uses the priority status of the packets buffered in the output buffer 114 to control the output of the packets (packets 141-143, for example) to the network segment 104. In one embodiment, the output control module 116 preferentially selects for output those packets having the higher priority status over those packets having the lower priority status. As a result, the packets associated with the aggregations identified by the SAP module 120 as being potentially subject to a shrew attack are less likely to be dropped by the congestion control mechanism implemented by the output control module 116, and thereby mitigating the shrew attack. The output control module 116 can employ any of a variety of congestion control mechanisms that implement a preferential drop policy, such as the AQM policy or WRED policy identified above.

FIG. 2 illustrates an example implementation of the SAP module 120 of the network routing device 102 of FIG. 1 in accordance with at least one embodiment of the present disclosure. In the depicted example, the SAP module 120 includes a packet drop rate calculator 202, a fair prioritization controller 204, and a prioritization module 206. As noted above, the output control module 116 processes packets buffered in the output buffer 114 for output from the network routing device 102 to a network segment 104. In processing the packets for output, congestion on the network segment 104 (either normal congestion or congestion resulting from a shrew attack) may require that the output control module 116 drop packets (that is, cease attempting the transmission of a packet) such that only a subset of the packets buffered by the output buffer 114 are successfully transmitted by the network routing device 102 to the network segment 104. Thus, the preferential selection of packets marked as having a higher priority status over packets marked as having a lower priority status results in the higher priority status packets being less likely to be dropped in the event of network congestion potentially caused by a shrew attack.

The packet drop rate calculator 202 receives signaling from the line interface 106 regarding the incoming packets and the dropped packets, and from this information the packet drop rate calculator 202 determines the average packet drop rate across all of the packet flows and the current packet drop rate for each aggregation of packet flows. In one embodiment, these packet drop rates are calculated by the packet drop rate calculator 202 in terms of cumulative bytes dropped up to time t (identified as d(t)) to cumulative bytes received up to time t (identified as a(t)). Accordingly, the packet drop rate calculator 202 implements two counters for each aggregation: an arrival counter (Count(in)) to accumulate the number of bytes received for the corresponding aggregation; and a drop counter (Count(out)) to accumulate the number of bytes dropped for the corresponding aggregation. In one embodiment the packet drop rate calculator 202 implements these counters in a memory 208. To illustrate, FIG. 2 depicts four counter pairs 211-214 implemented in a SRAM 208, each counter pair corresponding to a different destination port (which serves as the aggregation criterion in this example).

To provide packet drop rate statistics that are less susceptible to small fluctuations in packet drop rates, the packet drop rate calculator 202, in one embodiment, calculates the average packet drop rate for each aggregation over a time sliding window (TSW). The time sliding window is composed of a contiguous set of N time intervals, wherein each time interval is a fixed duration of $t_s$ seconds. The duration of $t_s$ is selected so as to be sufficiently short so as to permit identification of the instant high packet drop rates, whereas N should be large enough to consider the previous instant packet drop rates. At the beginning of each time interval, the packet drop rate calculator 202 initializes the arrival counter and the drop counter for each aggregation with the cumulative bytes for the counters from the previous time interval (that is, a(t)=a(t−1) and d(t)=d(t−1)). During the time interval t, new byte arrivals or byte drops increment a(t) or d(t), respectively, by the appropriate amount. Thus, the packet drop rate calculator 202 can calculate the average packet drop rate $P_{avg}[x]$ for each aggregation x over a sliding window of the last N time intervals as represented by the following equation:

$$P_{avg}[x] = \frac{\Delta d(t)}{\Delta a(t)} = \frac{d(t) - d(t-N)}{a(t) - a(t-N)}$$

To calculate this average, the packet drop rate calculator 202 can maintain N pairs of counters for each aggregation. Using the time sliding window, the packet drop rate calculator 202 then can recursively free and reuse counters using a circular modulo counter allocation. Thus, the total number of counters needed per aggregation is 2*N in this instance. The average packet drop rate across all of the aggregations at time t ($P_{avg\_tot}(t)$) therefore can be calculated by the packet drop rate calculator 202 as:

$$P_{avg\_tot}(t) = \frac{\sum_{i=1...N} P_{avg}[i]}{N} = \frac{\sum_{i=1...N} \Delta d(t)}{\sum_{i=1...N} \Delta a(t)}$$

The average packet drop rate across all of the aggregations can be updated, for example, every $t_s$ seconds. The current or instant packet drop rate $P_i[x]$ for an aggregation x at time t can be calculated by the packet drop rate calculator 202 as the ratio of the cumulative arrived bytes for the aggregation to the cumulative dropped bytes for the aggregation at the time t, or:

$$P_i(t)[x] = \frac{d(t)[x]}{a(t)[x]}$$

The fair prioritization controller 204 determines the threshold packet drop rate ($P_{thresh}(t)$) used to identify aggregations having a packet flow that is potentially victim to a shrew attack. In one embodiment, the threshold packet drop rate is determined based on the average packet drop rate across all aggregations, and further based on a minimum packet drop rate $P_{min}$ such that the threshold packet drop rate is set to the greater of the average packet drop rate or the minimum packet drop rate $P_{min}$. The minimum packet drop rate $P_{min}$ is predetermined or otherwise set by a user or provider of the network routing device 102 and specifies the minimum packet drop rate at which the SAP mechanism does not intervene. Accordingly, the minimum packet drop rate $P_{min}$ preferably is set to a value sufficient to encompass small fluctuations in packet drop rates typically encountered in the packet flows in the absence of a shrew attack, but low enough to trigger the SAP mechanism quickly in the event of a shrew attack. An example value of 0.1% for $P_{min}$ has been identified as acceptable under certain conditions in simulations performed for the SAP mechanism.

The prioritization module 206 uses the dynamically-updated threshold packet drop rate $P_{thresh}$ to identify those aggregations having packet flows potentially subject to a shrew attack and to prioritize the packets of the identified aggregations accordingly so as to more fully ensure their successful transmission by the network routing device 102. In one embodiment, the prioritization module 206 makes this identification on the basis of a comparison of the instant packet drop rate $P_i(t)[x]$ of a selected aggregation x with the threshold packet drop rate $P_{thresh}(t)$. In the event that the instant packet drop rate for the selected aggregation is greater than the threshold packet drop rate (that is, when $P_i(t)[x] > P_{thresh}(t)$, the prioritization module 206 identifies the selected aggregation as potentially subject to a shrew attack. Conversely, in the event that the instant packet drop rate is not greater than the threshold packet drop rate (that is, when $P_i(t)[x] <= P_{thresh}(t)$), the prioritization module 206 identifies the selected aggregation as not subject to a shrew attack.

Rather than using a single threshold packet drop rate, in one embodiment the applicable threshold packet drop rate can be selected from multiple threshold packet drop rates. To illustrate, each application can have a separate threshold packet drop rate based on an average packet drop rate for just those aggregations associated with the particular application. To illustrate, one threshold packet drop rate could be calculated for packet flows associated with real-time applications and another threshold packet drop rate could be calculated for packet flows associated with file transfer applications. Alternately, the same average packet drop rate can be calculated, but different minimum threshold packet drop rates $P_{min}$ can be used for different aggregations.

Upon receipt of an outgoing packet, the prioritization module 206 identifies the aggregation to which the packet is associated and marks the packet as having either the higher priority status or the lower priority status based on whether the identified aggregation was determined to be potentially subject to a shrew attack. Upon marking the packet as having either the higher priority status or the lower priority status, the packet is placed in the output buffer 114. The output control module 116 then can employ a preferential packet dropping scheme, such as the AQM policy or the WRED policy, to preferentially select for transmission those packets from the output buffer 114 that have the higher priority status over those packets having the lower priority status (or, put another way, to preferentially drop those packets from the output buffer 114 that have the lower priority status over those packets having the higher priority status).

By selectively prioritizing outgoing packets of aggregations of packet flows having at least one packet flow that may be victim to a shrew attack, the SAP mechanism described above can mitigate the effects of the shrew attack by more fully ensuring that the packets of the victim packet flow are effectively transmitted. As such, the SAP mechanism can reduce the risk of TCP sessions closing during a shrew attack, as well as help maintain a normal throughput for packet flows during a shrew attack.

Although the present specification describes components and functions that may be implemented in particular embodiments with reference to particular standards and protocols, the invention is not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   determining, at a network routing device, an average packet drop rate for a plurality of aggregations of packet flows;
   determining, at the network routing device, a threshold packet drop rate based on the average packet drop rate;
   determining, at the network routing device, a current packet drop rate for a select aggregation of the plurality of aggregations; and
   determining, at the network routing device, whether at least one packet flow of the select aggregation is potentially subject to a denial-of-service attack based on a comparison of the current packet drop rate to the threshold packet drop rate.

2. The method of claim 1, further comprising:
   assigning a higher priority status to packets of packet flows of the select aggregation for transmission by the network routing device in response to determining at least one packet flow of the select aggregation is potentially subject to a denial-of-service attack; and
   assigning a lower priority status to packets of packet flows of the select aggregation for transmission by the network routing device in response to determining no packet flows of the select aggregation are subject to the denial-of-service attack.

3. The method of claim 2, further comprising:
   preferentially selecting for transmission by the network routing device packets having the higher priority status over packets having the lower priority status.

4. The method of claim 1, wherein preferentially selecting for transmission packets having the higher priority status over packets having the lower priority status comprises preferentially selecting packets in accordance with at least one of an Active Queue Management policy and a Weighted Random Early Detection policy.

5. The method of claim 1, wherein determining the average packet drop rate for the plurality of aggregations comprises determining the average packet drop rate over a time sliding window.

6. The method of claim 1, wherein determining the current packet drop rate for the select aggregation comprises determining the current packet drop rate based on a comparison of an accumulated data size of packets for packet flows of the select aggregation input to the network routing device to an accumulated data size of packets for packet flows of the select aggregation output by the network routing device.

7. The method of claim 1, wherein determining the threshold packet drop rate comprises one of setting the threshold packet drop rate to the greater of the average packet drop rate and a predetermined minimum packet drop rate.

8. The method of claim 1, wherein the network routing device comprises one of: a router; a bridge; and a switch.

9. A network routing device comprising:
   a line interface comprising a network input and a network output; and
   an attack protection module to determine an average packet drop rate for a plurality of aggregations of packet flows, to determine a threshold packet drop rate based on the average packet drop rate, and to determine a current packet drop rate for a select aggregation, the attack protection module further to determine whether at least one packet flow of the select aggregation of packet flows is potentially subject to a denial-of-service attack based on a comparison of the current packet drop rate to the threshold packet drop rate.

10. The network routing device of claim 9, wherein the attack protection module comprises:
    a prioritization module to assign a higher priority status to packets of packet flows of the select aggregation for transmission by the network routing device in response to determining at least one packet flow of the select aggregation is potentially subject to a denial-of-service attack and to assign a lower priority status to packets of packet flows of the select aggregation for transmission by the network routing device in response to determining no packet flows of the select aggregation are subject to the denial-of-service attack.

11. The network routing device of claim 9, wherein the line interface includes:
an output buffer coupled to the output interface; and
an output control module to preferentially select for transmission via the output interface packets in the output buffer that have the higher priority status over packets in the output buffer that have the lower priority status.

12. The network routing device of claim 11, wherein the output control module uses at least one of an Active Queue Management policy and a Weighted Random Early Detection policy in preferentially selecting packets for transmission.

13. The network routing device of claim 9, wherein the attack protection module includes a packet drop rate calculator to determine the average packet drop rate for the plurality of aggregations by determining the average packet drop rate over a sliding time window.

14. The network routing device of claim 9, wherein the attack protection module includes a packet drop rate calculator comprising a first counter to count an accumulated data size of packets for packet flows of the select aggregation received by the network routing device and a second counter to count an accumulated data size of packets for packet flows of the select aggregation output by the network routing device, and wherein the packet drop rate calculator further is to determine the current packet drop rate for the select aggregation based on a comparison of a value of the first counter to a value of the second counter.

15. The network routing device of claim 9, wherein the attack protection module includes one of a fair prioritization controller to set the threshold packet drop rate to the greater of the average packet drop rate and a predetermined minimum packet drop rate.

16. The network routing device of claim 9, wherein the network routing device comprises one of: a router; a bridge; and a switch.

17. A method comprising:
determining, at a network routing device, a first average packet drop rate for a plurality of aggregations of packet flows for a first interval;
determining, at the network routing device, a first threshold packet drop rate based on the first average packet drop rate;
assigning, at the network routing device, a higher priority status to packets of packet flows of a select aggregation of the plurality of aggregations at a first time in response to determining a current packet drop rate of the select aggregation at the first time is greater than the first threshold packet drop rate;
determining, at the network routing device, a second average packet drop rate for the plurality of aggregations of packet flows for a second interval subsequent to the first interval;
determining, at the network routing device, a second threshold packet drop rate based on the second average packet drop rate;
assigning, at the network routing device, a lower priority status to packets of the packet flows of the select aggregation at a second time in response to determining a current packet drop rate of the select aggregation at the second time is greater than the second threshold packet drop rate, the second time subsequent to the first time; and
preferentially selecting for transmission by the network routing device packets having the higher priority status over packets having the lower priority status.

18. The method of claim 17, wherein:
determining the first current packet drop rate for the select aggregation comprises determining the first current packet drop rate based on a comparison of a first accumulated data size of packets for the packet flows of the select aggregation received by the network routing device up to the first time to a first accumulated data size of packets for packet flows of the select aggregation output by the network routing device up to the first time; and
determining the second current packet drop rate for the select aggregation comprises determining the second current packet drop rate based on a comparison of a second accumulated data size of packets for the packet flows of the select aggregation received by the network routing device up to the second time to a second accumulated data size of packets for packet flows of the select aggregation output by the network routing device up to the second time.

19. The method of claim 17, wherein:
determining the first threshold packet drop rate comprises one of setting the first threshold packet drop rate to the greater of the first average packet drop rate and a predetermined minimum packet drop rate; and
determining the second threshold packet drop rate comprises one of setting the second threshold packet drop rate to the greater of the second average packet drop rate and the predetermined minimum packet drop rate.

20. The method of claim 17, wherein preferentially selecting for transmission packets having the higher priority status over packets having the lower priority status comprises preferentially selecting packets in accordance with at least one of an Active Queue Management policy or a Weighted Random Early Detection policy.

* * * * *